Sept. 10, 1968      J. W. SLOVER      3,400,753

LEAK PREVENTING CONTROL FOR HEAT EXCHANGERS

Filed Sept. 2, 1966

INVENTOR
J. W. SLOVER

BY *Young & Quigg*
ATTORNEYS

United States Patent Office 3,400,753
Patented Sept. 10, 1968

3,400,753
LEAK PREVENTING CONTROL FOR HEAT EXCHANGERS
James W. Slover, Borger, Tex., assignor to Phillips Petroleum Company, a corporation of Delaware
Filed Sept. 2, 1966, Ser. No. 576,923
8 Claims. (Cl. 165—1)

ABSTRACT OF THE DISCLOSURE

A control system for an indirect heat exchanger wherein heat is extracted from a hot stream by a cold stream, whereby the flow of one or both of the streams is independently controlled at predetermined levels until a predetermined pressure differential between the two streams is exceeded, at which time the flow rate of one or both of the streams is manipulated solely to yield the predetermined pressure differential.

---

Figure 1:
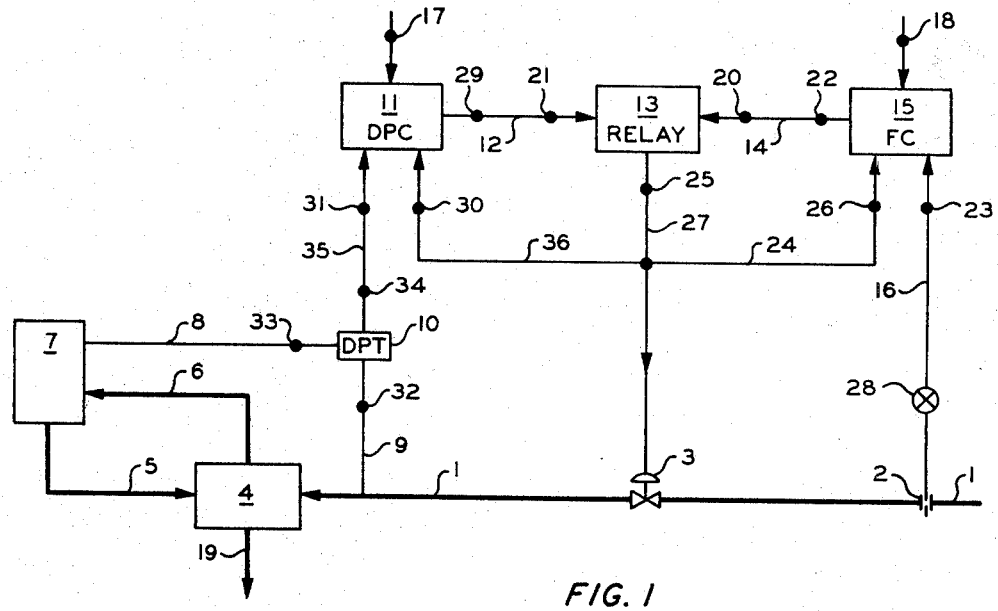

This invention relates to a control system for heat exchangers. In another aspect, this invention relates to a method of and apparatus for preventing leakage between two fluids in a heat exchange apparatus.

In many pressurized indirect heat exchange systems wherein one fluid extracts heat from a second fluid, leakage between the streams will result in undesirable chemical reactions, solutions, or mixtures. For example, in catalytic reaction processes which utilize catalysts such as hydrogen fluoride or a transition metal salt such as titanium tetrachloride with an alkyl aluminum halide reducing compound, the latter of which is highly reactive with and deactivated by water, it is necessary to prevent water from entering all feed streams to the catalytic reaction processes during prior treatment such as feed preheating by steam condensation in heat exchange apparatus. Steam and/or condensate often does enter such a feed stream by passage through small openings in the metal surfaces separating the two fluids that develop in various ways. For example, weak spots in tubing walls due to faulty manufacture or corrosion will result in small openings that will enlarge as flow increases through them, and leaks many times develop around unwelded or poorly welded joints in the tubing. Adding to these problems, is the fact that steam pressure within any one heating apparatus will as a general rule increase with duration of use. This is true because as the apparatus is used, fouling caused by deposits and corrosion build up on the interior and the exterior walls of the steam heating bundle. This in turn causes a decrease of the heat transfer coefficient through the steam bundle, and thus a progressive increase in the steam pressure, in order to provide the differential temperature driving force, is necessary to deliver the required amount of heat per unit time. Many times this action causes the steam pressure to remain higher than the pressure under which the process fluid is maintained for long periods of time; consequently, there results an ideal situation whereby steam and/or water can leak through any openings in the separating metal walls and enter the process fluid.

Also, when using "economizer" heat exchangers such as between feed to and effluent from a chemical or physical process, it is frequently necessary to prevent even minor leakage between similar and compatible heat exchanging fluids. For example, in chemical processes, when a hot effluent product stream is cooled by a cold reactant feed stream, and leakage of the reactant stream into the product stream will result in undesirable reactions, or will raise the impurity level of the product stream above a critical or specified concentration, then it is necessary to contrive method and apparatus which will prevent this leakage.

According to one aspect of this invention, leakage into a first fluid of a first fluid system by a second fluid from a second fluid system in an indirect heat exchange apparatus is prevented by controlling the said second fluid system in response to a characteristic such as flow rate of said second fluid except in those instances when the operating pressure of the said second fluid system tends to exceed the operating pressure of the said first fluid system, in which instance, control of the flow rate and thereby the operating pressure of said second fluid system is conducted in response to the differential pressure between the said first and second fluid systems.

According to another aspect of this invention, leakage between fluids of two fluid systems in an indirect heat exchange apparatus is prevented by controlling the said fluid systems in response to a characteristic such as flow rates of the said fluids except in those instances when the differential pressure between the two said fluid systems reaches an abnormal value, in which instance, the control of the said fluid systems is conducted in response to the differential pressure between the two said fluid systems.

Therefore, one object of this invention is to provide a method of and apparatus for preventing the leakage of one fluid stream into another fluid stream in an indirect heat exchange apparatus.

Another object of this invention is to provide a method of and apparatus for preventing leakage between two fluid streams in an indirect heat exchange apparatus.

Other objects, aspects, and advantages of the invention will be apparent from the study of the disclosure, the drawings, and the appended claims.

Figure 2:
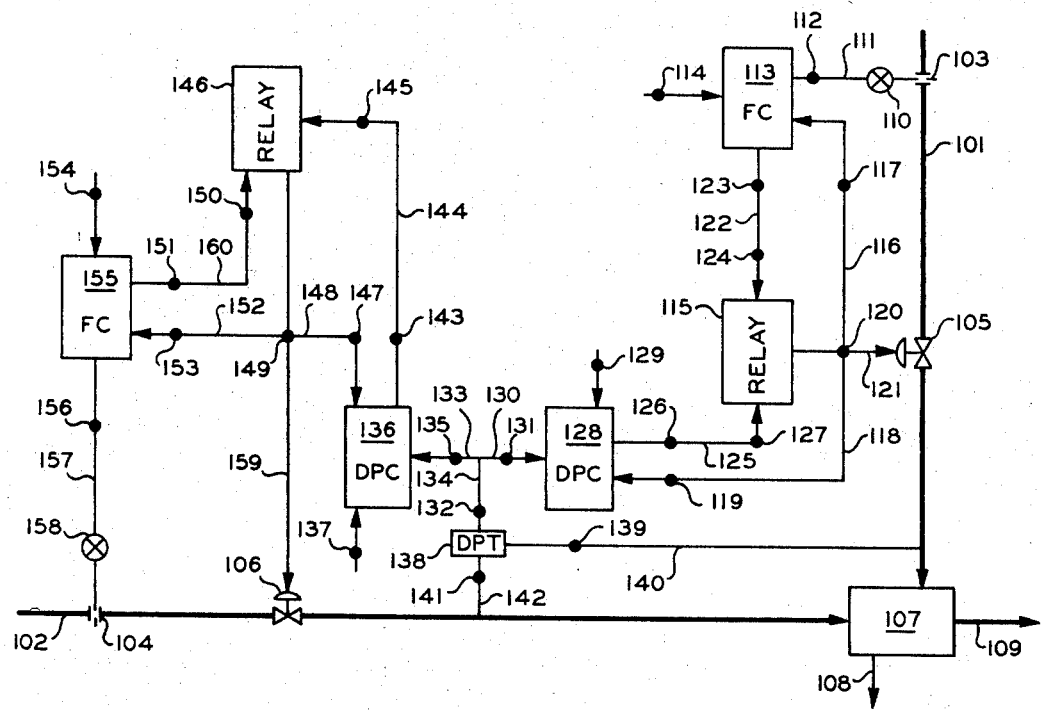

In the drawings, FIGURE 1 is a schematic representation of an indirect fluid heat exchange system utilizing a control system in accordance with one embodiment of the invention; FIGURE 2 is a schematic representation of an indirect fluid heat exchange system utilizing a control system in accordance with another embodiment of the invention.

Referring now to the drawings and to FIGURE 1 in particular, reboiler 4 is shown operatively connected to fractionating column 7 by conduits 5 and 6. The feed, kettle, and overhead streams for fractionating column 7 are not shown in FIGURE 1. This use of heat exchange apparatus is not intended to limit the scope of this invention. This invention can be used with any type of two-fluid heat exchanger known in the art which is used to exchange heat in physical separation and/or chemical reaction processes. Reboiler 4 is an indirect heat exchange apparatus having an inner and an outer system. Liquid from fractionator 7 flows into the outer system (shell side) of reboiler 4 via conduit 5 and the vapor liquid mixture returns from reboiler 4 to fractionator 7 via conduit 6. A heating fluid such as steam enters the inner system (tube side) of reboiler 4 via conduit 1 and condensate therefrom leaves reboiler 4 via conduit 19, generally to a condensate recovery system, not shown, which frequently is operated at superatmospheric pressures. Process control valve 3 is operatively positioned within conduit 1 and regulates the rate of flow of heating fluid in conduit 1. During normal operations, valve 3 is operated by flow controller 15 which may be any suitable type controller known in the art, but preferably one with set point signal input 18, measurement signal input 23, antireset-windup-feedback input 26, and control signal output 22. Flow sensing means 2 is operatively associated with conduit 1 for the purpose of producing an output signal which is representative of the rate of flow of the heating fluid through conduit 1. Flow sensing means 2 is shown in the diagram as an orifice; however, it may be any other type flow sensing means known in the art such as a pitot tube, a venturi, or a magnetic or turbine flow meter. Orifice 2 is shown operatively connected to flow transmitter 28 which is in turn operatively connected to rate of flow controller 15 by line 16. Output line 14 operatively connects flow controller 15 and relay 13, and line 27 operatively connects relay 13 and the diaphragm of valve 3. Relay 13 may be any type selector relay known in the art having a first signal input 20, a second signal input 21 and a signal output 25. Whether selector relay 13 is a low pass (selects the smaller of the two signals impressed on inputs 20 and 21 and passes it to output 25) or a high pass relay will depend on whether controllers 11 and 15 are direct action controllers or reverse action controllers and whether valve 3 requires an increasing signal to close or a decreasing signal to close, but any operable combination known in the art may be selected. Additionally, other relays known in the pneumatic control art may be used such as the type known as the 1:1 (one-to-one) volume booster or isolating relay. Differential pressure sensing means 10 is shown operatively connected to fractionator 7 by conduit 8, and to conduit 1 by conduit 9. Differential pressure sensing means 10 may be any type differential pressure transmitter known in the art with pressure signal inputs 32 and 33, and measurement signal output 34. Differential pressure controller 11 may be any suitable type controller known in the art, but preferably one with a set point signal 17, a measurement signal input 31, an antireset-windup feedback signal input 30 and a control signal output 29. Differential pressure controller 11 is connected to differential pressure sensing means 10 by line 35, and to selector relay 13 by line 12. Line 36 connects selector relay signal output 25 with input 30 of differential pressure controller 11, and line 24 connects output 25 of selector relay 13 with input 26 of flow rate controller 15 so as to nullify the "windup" of the reset mechanism of that controller whose output signal is not being applied to valve 3. The system of this invention can be either electrically or pneumatically controlled; however, the following description of the system of this invention pertains to a pneumatic system comprising reverse action controllers, a low-pass selector relay, and a valve which closes progressively with a decreasing input signal (an air-open valve).

Under normal operating conditions, the heating fluid will flow through conduit 1, flow sensing means 2, and valve 3, and the position of valve 3 will be controlled by flow rate controller 15 so as to cause the magnitude of the flow measurement transmitted by line 16 to achieve the value of the set point signal input 18 by way of forming a resultant output signal which is transmitted to relay 13 by line 14. During this normal operation, the magnitude of the control signal directed to relay 13 by line 12 from controller 11 will be as great or greater than the control signal of line 14 to relay 13; consequently, the signal transmitted by line 27 to valve 3 will be of a magnitude determined by the flow rate controller 15. However, when the pressure in conduit 1 rises toward and may possibly exceed the pressure in fractionator 7, so that control action to prevent leakage of the fluid of conduit 1 into reboiler 4 and thereby into fractionator 7 is required, differential pressure sensing means 10 will transmit this decreased differential pressure signal via line 35 to controller 11, wherein control action by comparison with set point 17 and employment of proportional and integral modes will result in the magnitude of the signal at output 29 falling below the magnitude of the signal at output 22. Thereby, the lesser output possible from relay 13 appears at input 21 via conduit 12, and as the result of the action of selector relay 13 this signal appears at output 25 and is transmitted by conduit 27 to valve 3 which it manipulates responsive only to variations in the signal at output 29 from differential pressure controller 11. When the pressure within conduit 1 again equals or falls below the pressure in fractionator 7, then the output from the differential pressure controller 11 will again be equal to or greater than the output of the flow rate controller 15, and the output from selector relay 13 will again represent the output signal from flow rate controller 15. This method can also be carried out with a 1:1 volume-booster or isolating relay instead of a selector relay. However, when the 1:1 relay is so substituted, the relay 13 input designated 21 is its air supply input and the input 20 is its signal input. Thereby, relay 13 will pass the signal at input 20 so long as the "supply" at input 21 is the greater and can and will pass only the input 21 "supply", when the signal at input 20 is the greater. As previously noted, the signal output 25 of relay 13 is connected by lines 36 and 24 to antireset-windup feedback inputs 30 and 26 of controllers 11 and 15, respectively. This latter connection is advantageous in preventing reset-windup of the controller which does not have control of valve 3, and in preventing the abnormal control fluctuations that would result when the other controller gains control of valve 3, but the invention will function without these connections.

FIGURE 2 is a schematic representation of another embodiment of this invention as applied to a shell and tube heat exchanger. A first fluid flows through conduit 101, flow sensing means 103, valve 105 into the shell side of heat exchanger 107, and out conduit 108. A second fluid stream flows through conduit 102, flow sensing means 104, valve 106, and through the tubes of heat exchanger 107, and out conduit 109. Flow controllers 113 and 155 may be any type of flow controller known in the art but preferably are controllers with set point inputs 114 and 154, signal inputs 112 and 156, and anti-reset-windup feedback inputs 117 and 153, and outputs 123 and 151, respectively. Flow sensing devices 103 and 104 may be any type of flow sensing devices known in the art such as orifices, pitot tubes or magnetic or turbine meters. Flow transmitting means 110 and 158 transmit the flow rate signals to controllers 113 and 155 by lines 111 and 157 to inputs 112 and 156, respectively. Booster relays 115 and 146 may be any type of 1:1 volume boosting or isolating relay used in the art having signal inputs 124 and 150, air supply inputs 127 and 145, and outputs 120 and 149, respectively. Relay 146 is connected to valve 106 by line 159 and to flow controller 155 and differential pressure controller 136 by lines 160 and 144, respectively. Relay 115 is connected to valve 105 by line 121 and to flow controller 113 and differential pressure controller 128 by lines 122 and 125, respectively. Differential pressure controllers 128 and 136 may be any type of differential pressure controllers used in the art, but preferably are controllers with set point inputs 129 and 137, measurement inputs 131 and 135 and anti-reset-windup feedback inputs 119 and 147, and outputs 126 and 143, respectively. Differential pressure controller 128 is connected to relay 115 by line 125, and differential pressure controller 136 is connected to relay 146 by line 144. Differential pressure sensing means 138 is operatively connected to conduits 102 and 101 by conduits 142 and 140, respectively. Differential pressure sensing means 138 can be any type of differential pressure transmitter known in the art with inputs 141 and 139 and output 132. Differential pressure sensing means 138 is connected to controllers 128 and 136 by transmission lines 134, 130 and 133. Output 120 of relay 115 is connected to anti-reset-windup inputs 119 and 117 of differential pressure controller 128 and flow controller 113 by lines 118 and 116, respectively, and output 149 of relay 146 is connected to anti-reset-winding inputs 147 and 153 of differential pressure controller 136 and flow controller 155 by lines 148 and 152, respectively. The latter two connections are advantageous in preventing reset-windup of the controllers that do not have control of valves 105 and 106. Even though there is great advantage in preventing this reset-windup, the invention will function without the said latter two connections.

This system may utilize either electrical or pneumatic energy but the following explanation will pertain to a pneumatic system comprising reverse action controllers 155, 128, 113, direct action controller 136, booster relays 146 and 115, and control valves 106 and 105 which open with increasing outputs from relays 146 and 115. This system operates to prevent leakage between the two fluid streams in heat exchanger 107 by maintaining the pressures of the two fluids within the heat exchanger at substantially the same value. Thus, when the fluid streams flowing through conduits 101 and 102 are at substantially the same pressure, and set point values of +1 p.s.i. and −1 p.s.i. (based upon the subtraction of the pressure in conduit 102, via conduit 142, from the pressure in conduit 101, via conduit 140, performed in differential pressure transmitter 138) are applied at inputs 129 and 137, respectively, the differential pressure control signals at inputs 127 and 145 of relays 115 and 146 will be equal to or greater than the flow control signals at inputs 124 and 150 of relays 115 and 146, respectively. Under these conditions, the signals at outputs 120 and 149 from relays 115 and 146 are the same as the corresponding output signals from flow rate controllers 113 and 155, respectively. If the pressure of the fluid flowing through conduit 101 increases above the pressure of fluid flowing through conduit 102, a changed value of differential pressure is transmitted to controllers 128 and 136 wherein comparisons with set points 129 and 137 are made. As the result thereof, the output from differential pressure controller 128 will fall below the output of flow rate controller 113 which will cause the signal at output 120 to decrease, to that value appearing at output 126, since the maximum signal available from relay 115 is that which is supplied at inlet 127. This will in turn cause valve 105 to progressively close so that flow through conduit 101 and the pressure therein will decrease and thus the differential pressure between conduits 101 and 102 returns to its set point (129) value. At this same time, the signal at output 143 from differential pressure controller 136 will be as great or greater than the signal at output 151 from flow rate controller 155, and the signal at relay output 149 will be the same as the flow controller signal at output 151. Thus, this inventive control system acts to reduce the pressure of the higher-fluid-pressure streams in the heat exchange system without changing the normal control method for the lower-fluid-pressure stream. When the pressure of stream 101 again substantially equals the pressure of stream 102, the signal at output 126 of differential pressure controller 128 will again be as great as or greater than the output from flow rate controller 113 which will again allow flow rate controller 113 to regain control of valve 105. When the control operation is carried out in this manner, differential pressure controllers 128 and 136 respond so that the signals at the outputs from the said differential controllers will regulate the positions of valves 105 or 106 whenever the heat exchange pressure of the fluid flowing through one of them exceeds the heat exchange pressure of the fluid flowing through the other. As in the previous example, the isolating relays can be replaced by diverting (selector) relays, and the directions of action of the valves and the controller can be reversed so long as a compatible control system results.

While the invention has been described in conjunction with the abovementioned embodiments, it should be evident that it is not limited thereto.

I claim:

1. An indirect heat exchange apparatus adapted to control leakage between hot and cold fluid streams supplied thereto comprising in combination an inner pressurized system with inlet and outlet conduit means, and an outer pressurized system with inlet and outlet conduit means, valve means operatively positioned in at least one of said conduit means, differential pressure sensing means having one sensing lead operatively associated with said inner pressurized system and the other sensing lead operatively associated with said outer pressurized system for producing an output signal representative of the difference in pressure between fluid flowing through said inner and outer pressurized systems, said apparatus having associated with each of said value means a differential pressure controller having a differential pressure measurement input, a setpoint signal input, and an output, means connecting said output signal of said differential pressure sensing means to said differential pressure measurement inputs of each of said differential pressure controllers, a flow sensing means operatively connected in each conduit, wherein a valve means is operatively positioned, for producing an output signal representative of the flow rate through said conduit, a flow controller having a flow measurement signal input, a setpoint signal input, and an output, means connecting said output signal of said flow sensing means to said flow measurement signal input of said flow controller, a selector relay having first and second inputs, and an output, means connecting said output of said flow controller with the first input of said selector relay, means for connecting the output from the differential pressure controller for each said valve means to said second input of said selector relay, and means connecting said output of said selector relay to said valve means to regulate the rate of fluid flow therethrough responsive to the output of said selector relay.

2. The apparatus of claim 1 wherein the differential pressure controller and said flow controller have anti-reset-windup feedback inputs with means connecting said output of said selector relay with said anti-reset windup feedback inputs.

3. The apparatus of claim 1 having one valve means associated with one of said input conduits.

4. The apparatus of claim 1 having one valve means associated with one of said output conduits.

5. The apparatus of claim 1 having a valve means associated with each of said input conduits.

6. The apparatus of claim 1 having a valve means associated with each of said output conduits.

7. A method of controlling flow of a first fluid stream and preventing leakage of a second fluid stream into said first fluid stream in an indirect heat exchange device wherein heat is extracted from one of said fluid streams by the other fluid stream comprising:
 (a) measuring the flow rate of said first fluid stream and comparing it with a predetermined flow rate;
 (b) measuring the difference in pressure between said first and said second fluid streams and comparing it with a predetermined pressure differential which is substantially zero or a value which indicates the pressure of said first fluid stream is greater than the pressure of said second fluid stream;
 (c) regulating the flow rate of said first fluid stream to yield said predetermined flow rate when the measured pressure differential is substantially zero or a value which indicates the pressure of said first fluid stream greater than the pressure of said second fluid stream; and
 (d) regulating the flow rate of said first fluid stream to yield said predetermined pressure differential when said measured pressure differential is a value which indicates that the pressure of said second fluid stream is greater than the pressure of said first fluid stream.

8. A method of controlling flow of a first and a second fluid stream and preventing leakage between said first and second fluid streams in an indirect heat exchange device wherein heat is extracted from one of said fluid streams by the other fluid stream comprising:
 (a) measuring the flow rate of said first fluid stream and comparing it with a first predetermined flow rate;
 (b) measuring the flow rate of said second fluid stream and comparing it with a second predetermined flow rate;
 (c) measuring the difference in pressure between said first and second fluid streams and comparing it with a predetermined pressure differential which is substantially zero;

(d) regulating the flow rates of said first and second fluid streams to yield said first and second predetermined flow rates respectively when the measured difference in pressure between said first and second fluid streams is substantially zero; and (e) regulating the flow rates of said first and second fluid streams to yield said predetermined pressure differential when the measured difference in pressure between said first and second fluid streams is not substantially zero.

References Cited

UNITED STATES PATENTS

| 1,738,455 | 12/1929 | Smith | 165—70 |
| 2,006,035 | 6/1935 | Stewart | 165—39 X |
| 2,309,296 | 1/1943 | Bentley | 165—39 X |
| 2,751,756 | 6/1956 | Hughes et al. | 165—39 X |

ROBERT A. O'LEARY, *Primary Examiner.*

A. W. DAVIS, JR., *Assistant Examiner.*